Patented Oct. 10, 1933

1,929,863

UNITED STATES PATENT OFFICE 1,929,863

PROCESS OF PREPARING ORTHO-AMINO-CARBOXYLIC ACID ESTERS OF THE ANTHRAQUINONE SERIES

Karl Wilke, Frankfort - on - the - Main - Hochst, Germany, assignor to General Aniline Works, Inc., New York, N. Y., a corporation of Delaware No Drawing. Application June 6, 1929, Serial No. 369,015, and in Germany June 21, 1928.

6 Claims. (Cl. 260—60)

The present invention relates to a process of preparing ortho-amino-carboxylic acid esters of the anthraquinone series.

I have found that in the presence of agents having an alkaline action hydroxyl-containing compounds of the following formula: R—OH wherein R stands for alkyl or aryl, as for instance alcohol or phenol are capable of combining additively with anthraquinone-isoxazoles. In this manner ortho-amino-carboxylic acid esters are obtained according to the following equation:

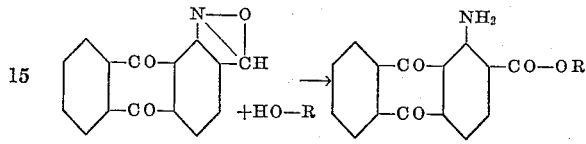

the isoxazol ring being split up.

The ortho - amino - anthraquinone - carboxylic acid esters are intended to be used as intermediate products for the manufacture of dyestuffs.

The following examples illustrate my invention but they are not intended to limit it thereto, the parts being by weight.

(1) 10 parts of anthraquinone-1.2-isoxazole are gently heated on the water bath with 4 parts of potassium cyanide in 100 parts of methyl alcohol until a thick, brownish-red paste has been formed. The mass is then filtered and washed with alcohol and water. The 1-amino-anthraquinone-2-carboxylic acid methyl-ester thus obtained crystallizes from aqueous pyridine or from glacial acetic acid in the form of red crystalline needles which melt at 228° C. The product dissolves in concentrated sulfuric acid to a yellow solution which by the addition of para-formaldehyde turns violet-blue; it forms a yellowish-red alkaline hydrosulfite vat.

The 1-amino-anthraquinone-2-carboxylic acid ethyl-ester is obtained in an analogous manner by using ethyl alcohol instead of methyl alcohol. After recrystallization from benzene, it forms a bright red crystalline powder of the melting point 198° C.

(2) A dissolution of 2 parts of metallic sodium in 100 ccm of methyl alcohol is poured over 10 parts of anthraquinone-1.2-isoxazole and the mixture is boiled for a short time on the reflux apparatus. After cooling the amino-carboxylic acid methyl-ester is filtered and washed first with alcohol and then with water. It is identical with that obtained according to example 1.

(3) 5 parts of potassium cyanide are introduced at water-bath temperature while stirring into a melt of 10 parts of anthraquinone-1.2-isoxazole and 100 parts of phenol.

The coloration of the mixture which is at first yellow immediately turns red. On diluting with water, the 1-amino-anthraquinone-2-carboxylic acid phenyl-ester precipitates in a crystalline form. It forms, when recrystallized from glacial acetic acid, a reddish-golden brilliant powder of the melting point of 198° C.

I claim:

1. The process which comprises causing an anthraquinone-1.2-isoxazole to react with a compound of the general formula: R—OH wherein R stands for alkyl or an aryl group of the benzene series, in the presence of an agent of the group consisting of sodium methylate and potassium cyanide.

2. The process which comprises causing an anthraquinone-1.2-isoxazole to react with a compound of the general formula: R—OH wherein R stands for alkyl or an aryl group of the benzene series, in the presence of potassium cyanide while heating on a water bath.

3. The process which comprises causing an anthraquinone-1.2-isoxazole to react with a compound of the general formula: R—OH wherein R stands for alkyl or phenyl, in the presence of an agent of the group consisting of sodium methylate and potassium cyanide.

4. The process which comprises causing an anthraquinone-1.2-isoxazole to react with a compound of the general formula: R—OH wherein R stands for alkyl or phenyl, in the presence of potassium cyanide while heating on a water bath.

5. The process which comprises causing an anthraquinone-1.2-isoxazole to react with a solution of metallic sodium in methyl alcohol.

6. The process which comprises causing an anthraquinone-1.2-isoxazole to react with methyl alcohol in the presence of potassium cyanide while heating on a water bath.

KARL WILKE.